Oct. 22, 1935.  F. J. TARRIS  2,017,928
AIRCRAFT WHEEL BRAKE
Filed Feb. 2, 1933  3 Sheets-Sheet 1

INVENTOR
Frederick John Tarris
by his attorneys
Byrnes, Stebbins, Parmelee & Blenko Oct. 22, 1935.  F. J. TARRIS  2,017,928
AIRCRAFT WHEEL BRAKE
Filed Feb. 2, 1933  3 Sheets-Sheet 2
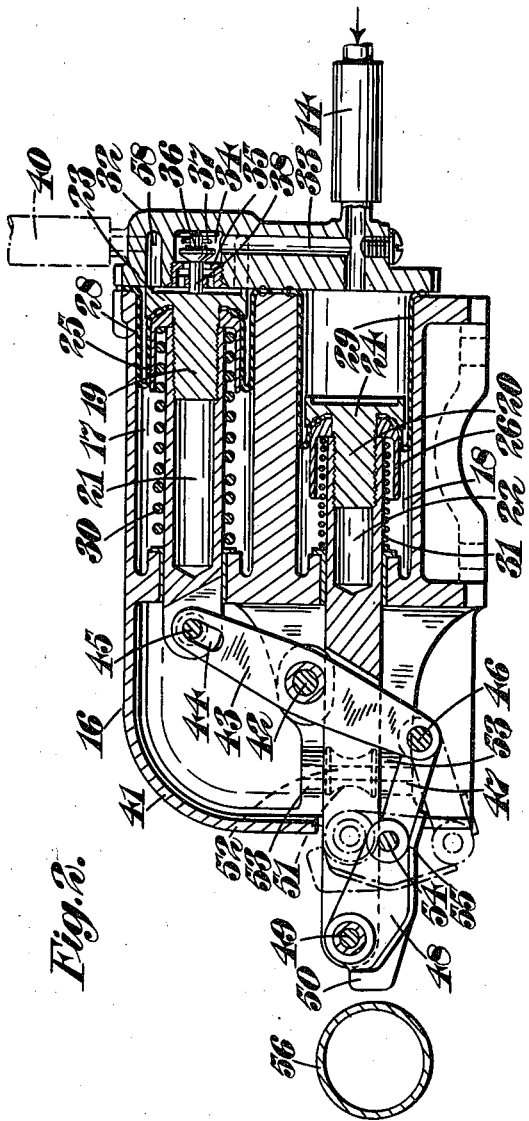
INVENTOR
Frederick John Tarris
by his attorneys
Byrnes, Stebbing, Parmelee & Blenko Oct. 22, 1935.     F. J. TARRIS     2,017,928
AIRCRAFT WHEEL BRAKE
Filed Feb. 2, 1933     3 Sheets-Sheet 3

INVENTOR
Frederick John Tarris
by his attorneys
Byrnes, Stebbins, Parmelee & Blenko Patented Oct. 22, 1935

2,017,928

UNITED STATES PATENT OFFICE 2,017,928

AIRCRAFT WHEEL BRAKE

Frederick John Tarris, London, England, assignor to The India Rubber, Gutta Percha and Telegraph Works Company Limited, London, England, a British company Application February 2, 1933, Serial No. 654,805
In Great Britain February 23, 1932

12 Claims. (Cl. 244—2)

This invention comprises improvements in or relating to aircraft wheel brakes under the control of mechanism of the type comprising a main control device which is operable by the aircraft pilot to control simultaneously the brakes on both sides of the centre line of the aircraft and a pair of auxiliary control devices one of which communicates with a brake or brakes of the wheel or wheels on one side of the centre line of the aircraft (referred to herein as one set of brakes), and the other with a brake or brakes on the other side of the centre line (referred to as the other set of brakes), the said auxiliary control devices being mounted in the aircraft so that each may be individually operated. This type of mechanism is referred to herein as "the type specified".

Normally, the auxiliary control devices will be associated with the rudder-bar for purposes of steering when landing, and will be so arranged that when the rudder-bar is turned to steer to the right, an auxiliary control device for the right-hand set of brakes will be operated and vice versa.

The present invention comprises for the operation of aircraft wheel brakes, a control mechanism of the type specified in which each of the auxiliary brake control devices is cross-connected with the opposite brake set in such manner that when the brakes of one set are applied or their effect increased by the appropriate auxiliary control device the cross-connections aforesaid will release or reduce any braking effort primarily imposed on the opposite brake set by the main control device.

The invention is particularly concerned with fluid-operated brakes in which the main auxiliary control devices operate by varying the fluid pressure applied to the brakes. An example of such gear is described in United States patent specification No. 563,487, to which the present invention is particularly applicable. The invention may be employed either with suction or pressure-operated brakes, but liquid pressure operation is preferred and will be described.

The invention also comprises mechanism of the type specified having in combination first and second auxiliary pressure-supplying devices, first and second auxiliary conduits for connecting the brakes with their respective auxiliary pressure-supplying devices, a main pressure-conduit for connecting to a main pressure-supplying device the two auxiliary conduits aforesaid, two valves situated as described in the auxiliary conduits, and two operative connections for the purpose described connecting these valves with their auxiliary pressure-supplying devices. Each valve is situated in the corresponding auxiliary conduit at a point which will be between the junction of that auxiliary conduit with the main conduit and the corresponding brake. The purpose of the operative connection is to close the corresponding valve as soon as an auxiliary pressure-supplying device is operated to increase the braking of the opposite brake set.

The invention further comprises brake control mechanism of the type specified in which the auxiliary control devices comprise pressure-supplying devices in which a pair of expansion devices are provided each affording a chamber of which the volume can be varied communicating with one set of brakes and each operatively connected with the auxiliary pressure-supplying device for the other set of brakes in such manner that when the latter is operated to force fluid into its set of brakes the expansion device will be operated to expand to afford a space for fluid from the other set of brakes.

Conveniently, a valve is provided operated automatically to cut off each expansion device from communication with the corresponding pressure-supplying device when that expansion device is being expanded. The valve may be connected to a moving part of the expansion device to be opened thereby only when the expansion device approximates to its most contracted condition. Alternatively, it may be a pressure-operated valve operated automatically to cut off such expansion device from communication with the corresponding pressure-supplying device when the pressure in the expansion device drops by a predetermined amount below that in the opposite pressure-supplying device.

The term "opposite" employed in this connection is to be understood to mean that the effect of the pressure-supplying device is operative on one brake set, whereas the expansion or relieving device is effective in conjunction with the other brake set.

In the prior specification referred to above, the auxiliary pressure-supplying devices move to their applied positions when the main brake control is released. This is a very desirable feature since it leaves the rudder-bar free to operate without moving the auxiliary devices during flight. An important feature of the present invention is the incorporation of this advantage with the features mentioned in the preceding paragraphs. Accordingly in one form of the invention the mechanism is of the type in which the auxiliary pressure-supplying devices move to their applied positions when the main brake control is released, and is characterized in that the operative connection between an expansion device and an auxiliary pressure-supplying device is such as to be disengaged during such movement, and to be engaged only during a movement of the auxiliary pressure-supplying device under pressure of its operating means.

The expansion device may be urged to its most contracted condition by means (e. g. a spring) of such strength that it will not be disturbed therefrom by the maximum braking pressure normally applied by the main pressure-supplying device. Under these circumstances it will always remain, until the rudder-bar is operated, in a condition in which its volume can be increased by as great an amount as possible.

In order that the invention may be more clearly understood a preferred example will now be described with the aid of the accompanying drawings, in which—

Figure 2 is a section on the line 2—2 of Figure 1.

Like reference numerals indicate like parts in the several figures of the drawings.

Figure 1:
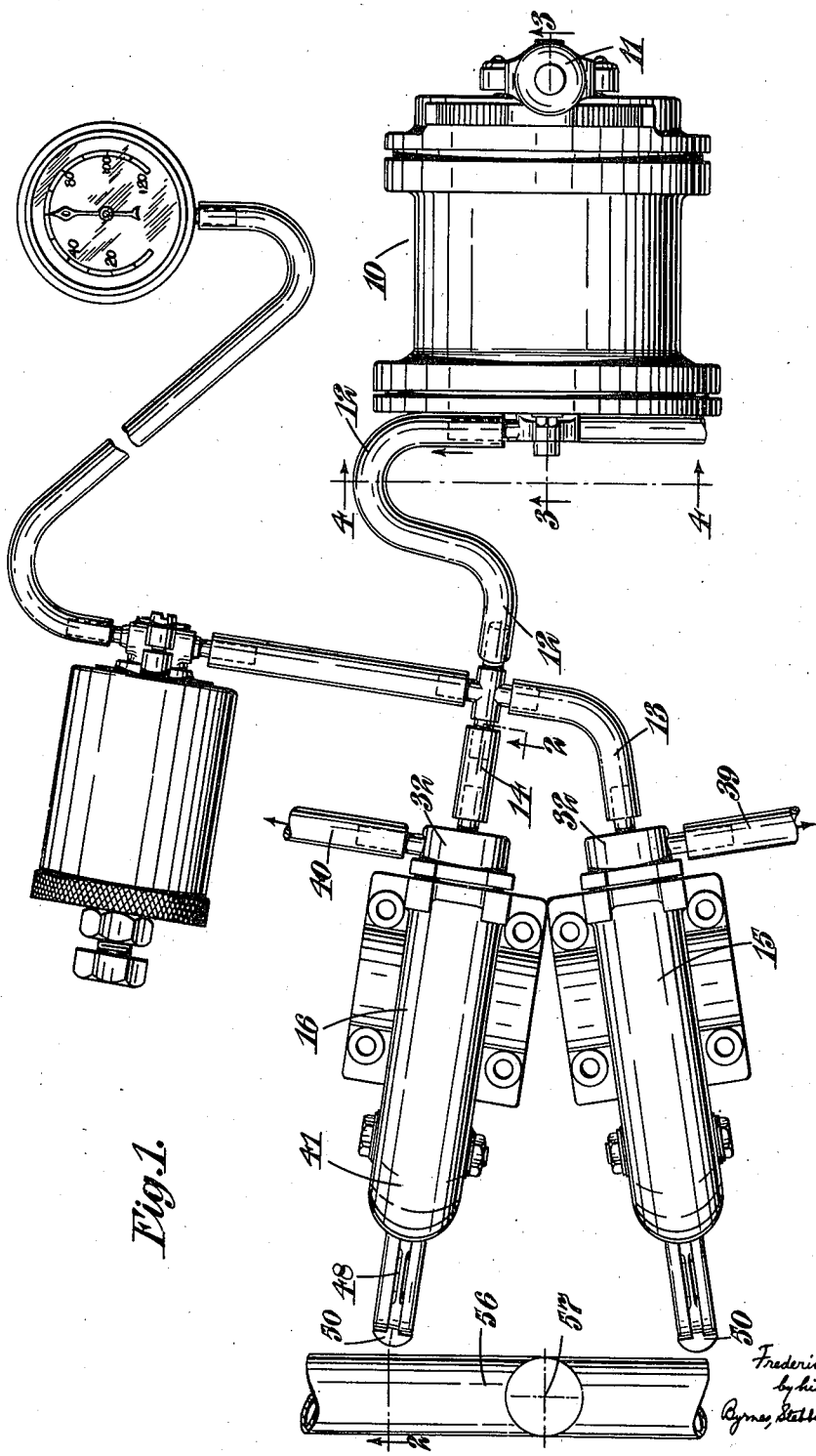
Figure 1 is a schematic plan view of the several parts required for the present invention.

In the apparatus illustrated there is a main pressure-applying device, referred to as the main brake device, indicated generally at 10. The details of this device will be referred to hereinafter and for the present suffice it to say that in this apparatus, by moving the brake-handle 11, pressure can be created at will to pass through a pipe 12 to the apparatus now to be described. From the pipe 12 connections 13 and 14 lead to auxiliary pressure-supplying devices 15 and 16 respectively. Each of the devices 15 and 16 is similar one to the other and a description of one will be, therefore, all that is necessary. One of the devices is illustrated in section in Figure 2 and comprises a pair of cylinders 17 and 18 which may be cast integral with one another and of which the cylinder 18 serves as the pressure-cylinder for one set while the cylinder 17 serves as the relieving cylinder for the other brake set. Each cylinder contains a piston, that in the cylinder 17 being designated by the reference 19 and that in cylinder 18 by the reference numeral 20. The pistons comprise piston-heads 23 and 24 having shanks that are screwthreaded within piston-rods 21 and 22 respectively and these heads clamp between them and flanges 25 and 26 respectively, corresponding ends of tubular diaphragms 28 and 29 which constitute seals for the pistons within their cylinders. The other ends of the diaphragms are clamped around the margins of their respective cylinders by the cover 32. The piston-rods 21 and 22 pass out through the opposite ends of their cylinders and are surrounded by helical springs 30 and 31 respectively which are normally in compression and are further compressed as the pistons are moved towards the left in Figure 2. The flanges 25 and 26 have skirts as shown which surround the helical springs 30 and 31 and serve each to press against the fold of the diaphragm associated with it to prevent the latter from expanding inwardly under pressure as the piston is advanced.

The two cylinders are provided with a single cover 32 in which fluid conduits are formed. The cylinders or pressure-chambers 18 of the two devices are coupled together and to the main pressure-applying device 10 by means of the conduits 12, 13 and 14. In each of the auxiliary devices a branch conduit 33 in the cover 32 extends from the conduits such as 13 or 14 to a valve-chamber 34. This chamber has a valve seating 35 screwed into it and a mushroom valve 36 pressed on to the seating by a spiral spring 36. The valve has a stem 38 extending through the seating into the relieving cylinder 17. When the piston 19 is in its fully-advanced position, that is to say, the position illustrated in Figure 2, it engages the end of the valve-stem 38 and lifts the valve 36 off its seating, thus opening the valve and at the same time opening communication between the cylinders 17 and 18. A further conduit 39 or 40 opens from the end of the cylinder 17 and communicates with the appropriate brake set. Portions of the conduits 39 and 40 only have been shown and their actual connections to the brake sets are not indicated in the drawings although it will be understood that each leads to the brake-actuating element of the appropriate brake set.

The cylinders 17 and 18 are cast integral with the surrounding casing 41 and a pin 42 secured in the casing serves as a pivot upon which a two-armed lever 43 can turn. One arm of the lever has a slot 44 engaging a pin 45 on the end of the piston-rod 21 and the other arm is pivotally connected by a pivot-pin 46 with one link 47 of a toggle linkage 47, 48. The other end of the link 48 is pivotally connected at 49 to the outer end of the piston-rod 22 and is cast integral with or is otherwise connected to a projection or cam 50 which is positioned to be engaged by a rudder-bar 56 or the like below the level of the pivot 49 so as to turn or tend to turn the link 48 in an anti-clockwise direction. The piston-rod 22 is guided between curved rollers 51, one on each side, pivoted on pins 52 carried in lugs 53 formed integral with the casing 41. The junction 54 of the toggle linkage 47, 48 is prevented from moving upwards materially beyond the extended position illustrated in Figure 2 by reason of abutments on the links which engage at a position designated by 55. In this position the axis of the pivot 54 remains slightly below a straight line joining the axes of pivots 46 and 49.

A rudder-bar 56 pivoted at 57 is symmetrically-disposed with relation to the two devices 15 and 16 and the latter are situated in front of the rudder-bar, that is to say, on the side of the rudder-bar remote from that which will be engaged by the feet of the pilot.

In Figure 1 pressure of the right foot of the pilot (to steer to the right) will turn the rudder-bar in an anti-clockwise direction, whereas that of the left foot (to steer to the left) will turn it in a clockwise direction. The conduit 39 leads to the left wheel brake set and the conduit 40 to the right wheel brake set.

Figure 4:
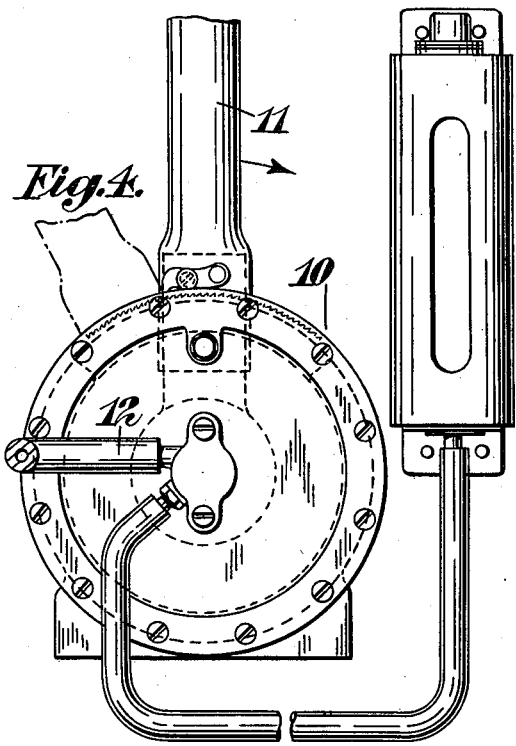
Figure 4 is a section on the line 4—4 of Figure 1 showing the main brake-applying device.
Figure 3:
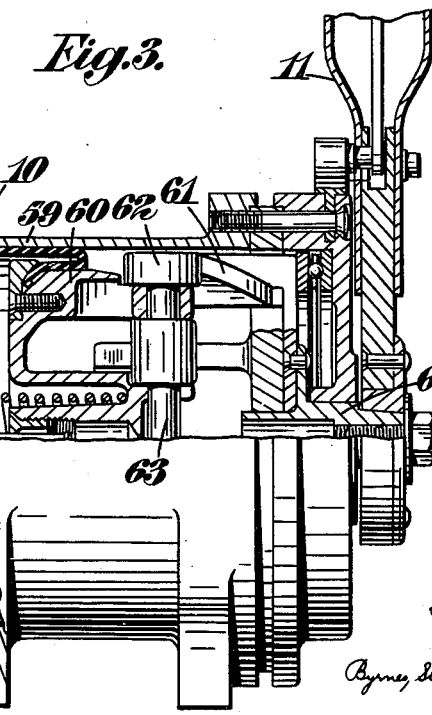
Figure 3 is a section on the line 3—3 of Figure 1.

In operation, assuming that the pilot landed without ruddering, or, having landed, has centralized the rudder-bar 56, and desires to brake the landing wheels he will move the brake-handle 11 in the direction of the arrow. It is assumed that this brake-handle has, in Figures 1, 3 and 4, been moved from the off position (i. e. the chain-line position in Figure 1) to the full-line position to produce partial braking pressure in the fluid system and the pressure fluid is conveyed through conduit 12 to conduits 13 and 14, thus thrusting both pistons 20 outwardly against light pressure of the spring 31 to the position illustrated in Figure 2. Pressure fluid passes through the conduits 33 of both auxiliary devices, thence past valves 36 into annular chambers 58 formed in the front cover 32, access being had to the chambers 58 past the fronts of the piston-heads 23 without moving the latter owing to the relatively strong resistance of spring 30. From the chambers 58 it flows through the conduits 39 and 40 to both brake sets, thus applying the brakes equally. If now it is desired to steer the craft either to the right or to the left the pilot will move the rudder-bar in the normal manner, that is to say, assuming that he desires to steer to the right he will press on the rudder-bar with his right foot, thereby turning the bar in an anti-clockwise direction. This brings the rudder-bar into engagement with the cam-projection 50 of the auxiliary device 15. The linkage 47, 48 is in the extended position and as the pressure of the rudder-bar will be below the axis of the pivot 49 such pressure will tend to keep the linkage in its extended position with the result that the piston 20 is moved outwardly (i. e. to the right) and the piston 19 (by means of the lever 43) is moved inwardly (i. e. to the left) in its cylinder. The effect of this is to permit the valve 36 of the auxiliary device 15 to close under the action of its spring 37 thereby to cut off further pressure supply to the left-hand brake set. At the same time the outward movement of piston 20 will force fluid from the cylinder 18 through conduit 13 into conduit 14 of the auxiliary device 16, the valve of which has not been seated. Thus, this additional pressure fluid will pass to conduit 40 and will increase the brake pressure in the right wheel brake set. Simultaneously with this happening, the piston 19 of the auxiliary device 15 will have moved inwardly and will have allowed pressure fluid from the left-hand brake set to expand into the front end of cylinder 17 so that not only will the pressure in the right-hand brake set be increased but that in the left-hand brake set will be reduced, thus producing very effective and delicate steering by means of the ground-wheels.

On release of the pressure applied by the main device 10, the pressure on both cylinders 17 and 18 will be released with the result that both pistons 19 and 20 will return to the right or outer ends of their cylinders and the toggle linkages 47, 48, will collapse. This is possible owing to the positioning of the pivotal axes of pins 54 below lines joining the axes of pins 46 and 49.

The invention has the further advantage that when the craft is landing under ruddering action to counteract the effect of a cross wind, application of the brakes by the brake-lever 11 will apply equal brake pressures to both brake sets and will not effect differential pressures as would occur by turning the rudder-bar to the same position after the lever 11 had been operated. This can be readily understood when it is realized that if the rudder-bar has been turned say in an anti-clockwise direction prior to actuation of the brake-handle 11, the rudder-bar itself will have been moved to such a position as to engage the cam-projection 50 of the auxiliary device 15 before the toggle linkage 47, 48 has reached its extended position so that the linkage can now yield under movement of the piston 20 without turning the lever 43 and consequently without moving the piston 19. Hence both valves 36 remain unseated and as soon as the brake-lever 11 is actuated pressure fluid will pass from the main device 10 equally to both brake sets through conduits 39 and 40. When, after landing, it is desired to obtain differential brake pressures for steering purposes, it is only necessary first to centralize the rudder-bar 56 so as to permit both pistons 20 to bring their toggle linkages 47, 48 to the extended positions whereafter steering can be effected as described above.

Although a description has been given of the operation of the apparatus when steering to the right, obviously the converse operation will occur when steering to the left.

The main brake device 10 comprises (see Figure 3) a cylinder 59 having within it a piston 60 provided with a spindle 63 extending diametrically across it at its rear end and through a central boss extending from the head of the piston. The spindle 63 carries rollers 62 which are engaged by helical cam surfaces 61 secured to or formed on a spindle 64 that is coaxial with the piston 60 and is rotated by the handle 11.

Thus, rotation of the latter serves, by cam action between the surfaces 61 and rollers 62, to press the piston 60 inwardly to force pressure fluid into and through the outlet pipe 12. This device is substantially identical with that described in prior British specification No. 16,750/30, to which reference may be had for a better understanding of the details of the construction and operation. As the device 10 of itself constitutes no part of the present invention a further description is deemed to be unnecessary.

It will be understood that the strength of the springs 30 will be such that they will not be compressed by the maximum braking pressure normally received from the main device 10 so that the pistons 21 will remain undisturbed in their forward position (i. e. with the expansion chamber in its most contracted condition) until actuation of the rudder-bar serves, through movement of the piston 22 of the auxiliary device associated with the other brake set, to apply additional pressure. The spring 31, on the other hand, is a light spring the pressure of which is overcome immediately pressure from the main device 10 is admitted to the cylinder 18.

I claim:—

1. For the operation of wheel-brakes in an aircraft having wheels on opposite sides of the fore and aft center line of the craft, control mechanism comprising in combination a main control device, a pair of auxiliary control devices, each said auxiliary device comprising pressure-producing means, pressure-relieving means, and an operative connection therebetween, and for each said auxiliary device a connection between the pressure-producing means thereof and the wheel-brakes on one side of the aforesaid center line and another connection between the pressure-relieving means of that auxiliary device and the wheel-brakes on the opposite side of said center line.

2. For the operation of wheel-brakes for an aircraft having wheels on opposite sides of the fore and aft center line of the craft, brake-adjusting means provided separately for the wheels on each side of the aircraft, each of said means comprising in combination two reciprocable pressure-fluid control devices and a releasable coupling operatively connecting them and means enabling said coupling to couple the two devices when one of them has approximately reached one end of its stroke and to release the coupling when desired to permit that device to move independently of the other.

3. For the operation of wheel-brakes for an aircraft having wheels on opposite sides of the fore and aft center line of the craft, brake-adjusting means provided separately for the wheels on each side of the aircraft, each of said means comprising in combination two reciprocable pressure-fluid control devices and a releasable coupling operatively connecting them and means enabling said coupling to couple the two devices when one of them has approximately reached one end of its stroke and to release the coupling when desired to permit that device to move independently of the other, said coupling means comprising a toggle linkage which is such as to be automatically in a position for locking when one of the control devices has approximately reached one end of its stroke.

4. For the operation of wheel-brakes for an aircraft having wheels on opposite sides of the fore and aft center line of the craft, brake-adjusting means provided separately for the wheels on each side of the aircraft, each of said means comprising in combination two reciprocable pressure-fluid control devices and a releasable coupling operatively connecting them and means enabling said coupling to couple the two devices when one of them has approximately reached one end of its stroke and to release the coupling when desired to permit that device to move independently of the other, said coupling means comprising a link which is mounted to swing about an axis located intermediate its two ends and which is pivotally connected on one side of said axis with one control device and on the other side of said axis with a toggle linkage interconnecting said link with the other control device.

5. For the operation of wheel-brakes in an aircraft having wheels on opposite sides of the fore and aft center line of the craft, control mechanism comprising in combination a main control device and a pair of auxiliary control devices, each said auxiliary device comprising a reciprocable pressure relieving device, a reciprocable pressure producing device, an operative connection therebetween and associated with said operative connection, an actuator for each said auxiliary control device movable into and out from positions for cooperation with the rudder bar such that in its non-cooperative position the actuator leaves the rudder bar free from encumbrance by it, and for each said auxiliary device also a connection between the pressure producing device and the wheel brakes on one side of the aforesaid center line and another connection between the pressure relieving device and the wheel brakes on the opposite side of the said center line.

6. For the operation of pressure fluid actuated aircraft wheel brakes in an aircraft having wheels on opposite sides of the fore and aft center line of the craft, a control mechanism according to claim 5 having the main control device connected to each of the reciprocable pressure producing devices of the pair of auxiliary control devices in each of which latter the pressure producing device is in fluid connection with the pressure relieving device, which is directly connected to the brakes on one side of the center line of the craft, by means of a fluid conduit provided with a valve for cutting off communication between the said chambers when the reciprocable pressure fluid control devices of the auxiliary devices are operated.

7. For the operation of pressure fluid actuated aircraft wheel brakes in an aircraft having wheels on opposite sides of the fore and aft center line of the craft, a control mechanism according to claim 5 having the main control device connected to each of the reciprocable pressure producing devices of the pair of auxiliary control devices in each of which latter the pressure producing device is in fluid connection with the pressure relieving device, which is directly connected to the brakes on one side of the center line of the craft, by means of a fluid conduit in which a valve constructed to be of a self-closing type is so located as to be engaged and opened by the reciprocable pressure relieving member when the latter is in a position such that no relief of pressure has been effected.

8. For the operation of pressure fluid actuated aircraft wheel brakes in an aircraft having wheels on opposite sides of the fore and aft center line of the craft, a control mechanism according to claim 5 having the main control device connected to each of the reciprocable pressure producing devices of the pair of auxiliary control devices in each of which latter the pressure producing device is in fluid connection with the pressure relieving device, which is directly connected to the brakes on one side of the center line of the craft, by means of a fluid conduit in which a valve constructed to be of a self-closing type is so located as to be engaged and opened by the reciprocable pressure relieving member when the latter is in a position such that no relief of pressure has been effected, said reciprocable pressure relieving member being provided with resilient means to maintain it in the position which has been described against the effect of the maximum braking pressure normally applied by the main control device.

9. For the operation of pressure fluid actuated aircraft wheel brakes in an aircraft having wheels on opposite sides of the fore and aft center line of the craft, a control mechanism according to claim 5 having the reciprocable pressure fluid control devices provided with an operative connection comprising a releasable coupling, means enabling said coupling to couple the two devices when one of them has approximately reached one end of its stroke and to release the coupling when desired to permit that device to move independently of the other, said coupling means comprising a link which is mounted to swing about an axis located intermediate its two ends and which is pivotally connected on one side of said axis with the pressure relieving device and on the other side of said axis with a toggle linkage connected to the pressure producing device, the actuator associated with said operative connection being provided on the toggle link pivotally connected to the swinging link.

10. For the operation of pressure fluid actuated aircraft wheel brakes in an aircraft having wheels on opposite sides of the fore and aft center line of the craft, a control mechanism according to claim 9 having as the main control device a hand-operated pressure producing device directly connected to the reciprocable pressure producing devices of auxiliary control devices, so that movement of the said reciprocable devices and actuators associated therewith is produced upon operation of the main control device, which latter is further connected from each reciprocable pressure producing device to each reciprocable pressure relieving device and the brakes to which the latter are respectively connected, by means of a fluid conduit provided with a valve adapted to cut off communication between the reciprocable pressure fluid control devices when the respective auxiliary control device is operated.

11. For the operation of wheel brakes in an aircraft having wheels on opposite sides of the fore and aft center line of the craft, a control mechanism comprising in combination a main control device to control the simultaneous operation of brakes for the wheels on both sides of the aforesaid center line, a rudder bar for the craft, and a pair of auxiliary control devices respectively connected to serve brakes on opposite sides of the center line of the craft, each of which auxiliary control devices comprises means to reduce the braking pressure of the brakes to which it is connected, a reciprocable actuator for the said means movable independently of the latter into and out from positions for cooperation with the rudder bar, and means to afford an operative connection between the reciprocable actuator and the means to reduce the braking pressure.

12. For the operation of wheel brakes in an aircraft having wheels on opposite sides of the fore and aft center line of the craft, a control mechanism according to claim 11 in which the means to afford an operative connection between the reciprocable actuator and the means to reduce the braking pressure comprises a collapsible linkage which is extended by independent movement of the actuator towards the rudder bar and which provides said operative connection only after full extension.

FREDERICK JOHN TARRIS.